(No Model.)
J. F. COYNE.
MARBLE SAWING MACHINE.
No. 334,217. Patented Jan. 12, 1886.
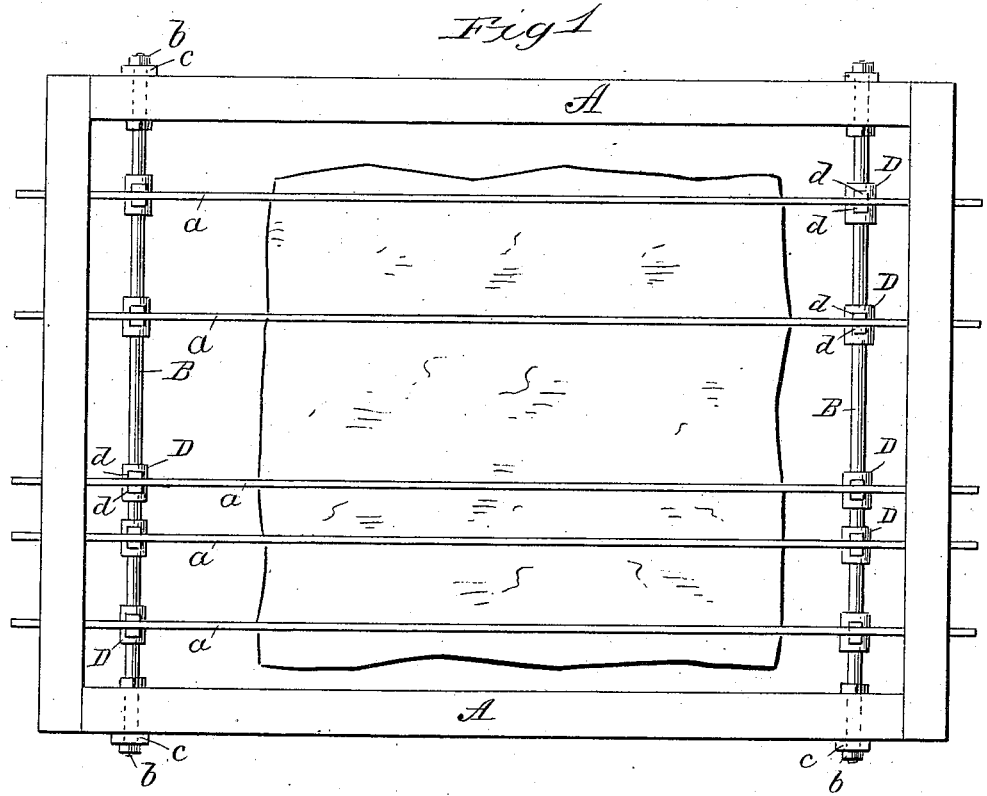
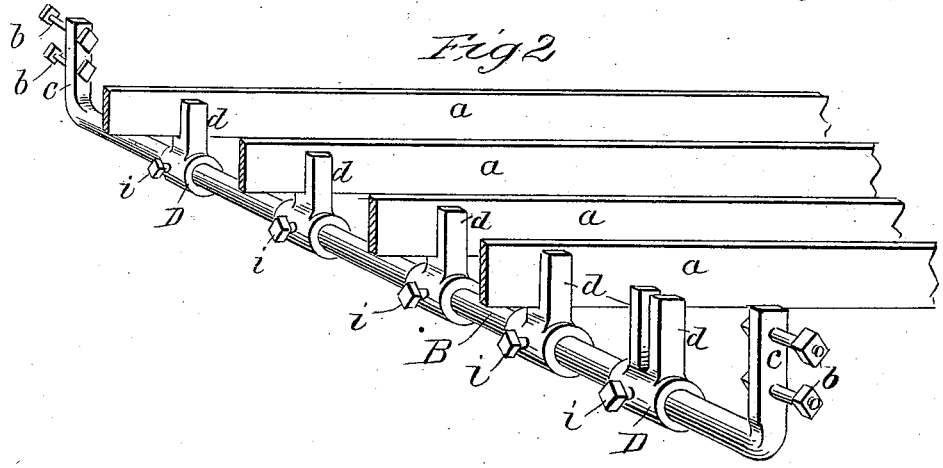
WITNESSES:
J. D. Garfield
C. Sedgwick
INVENTOR:
J. F. Coyne
BY Munn & Co
ATTORNEYS.

UNITED STATES PATENT OFFICE.

JAMES F. COYNE, OF CHICAGO, ILLINOIS.

MARBLE-SAWING MACHINE.

SPECIFICATION forming part of Letters Patent No. 334,217, dated January 12, 1886.

Application filed September 29, 1885. Serial No. 178,515. (No model.)

*To all whom it may concern:*

Be it known that I, JAMES F. COYNE, of Chicago, in the county of Cook and State of Illinois, have invented a new and useful Improvement in Marble-Sawing Machines, of which the following is a full, clear, and exact description.

My invention relates to the construction of gang saw racks, the object of the invention being to provide an attachment whereby the saws may be quickly and accurately spaced, and, when so spaced, held in vertical position and prevented from twisting, the attachment being designed to take the place of the old form of wooden gages.

Reference is to be had to the accompanying drawings, forming a part of this specification, in which similar letters of reference indicate corresponding parts in both figures.

Figure 1 is a plan view of a gang-saw rack provided with my improved spacing attachment, and Fig. 2 is a perspective view of the attachment removed from the rack.

The saws $a$ $a$ are secured in a frame or rack, A, in the ordinary manner, the frame A being such a frame as is commonly used for the purpose. Two bars, B B, are secured to the frame A by bolts $b$ $b$, which pass through the side bars of the frame and through apertures formed in the upwardly-projecting arms $c$ $c$ of the bars B B, the bars passing across the frame below the saws. Each of the bars B B carries a number of sleeves, D D, formed with outwardly-projecting lugs or fingers $d$ $d$, the space between said fingers being just wide enough to admit one of the saw-blades. The sleeves D D are all provided with set-screws $i$ $i$, by which they are firmly secured in any position to which they may be moved upon the bars B B.

The operation of the attachment is as follows: After the saws have been properly spaced the sleeves D D are moved along the bars B B until they are in a position such that when their fingers $d$ $d$ are turned up, as best shown in Fig. 2, one of the saw-blades will rest between each set of fingers, the set-screws $i$ $i$ being turned home to hold the sleeves in place. Such of the guides formed by the sleeves D and fingers $d$ $d$ as are not in use may be left to hang upon the bar, all rattling being prevented by simply tightening the set-screws.

I am aware that it is not new to employ a series of guides formed by sleeves and fingers, which guides are adapted to have movement only toward or from each other, while in my invention the guides are adapted to also turn upon their supporting-bars.

Having thus described my invention, I claim as new and desire to secure by Letters Patent—

The combination, with the frame A and saws $a$ $a$, of transverse cylinder-bars B B, carrying guides formed by sleeves D, fitted to turn upon the bars B B, and fingers $d$ $d$, that are held in place by set-screws $i$, substantially as described.

JAMES F. COYNE.

Witnesses:
ADOLPH RUTH,
FRANS. O. JAHNSON.